United States Patent
Eck

(10) Patent No.: US 7,297,081 B2
(45) Date of Patent: Nov. 20, 2007

(54) IDLER PULLEY WITH INTEGRAL BEARING CARRIER INSERT AND METHOD

(75) Inventor: Steven J. Eck, Springfield, MO (US)

(73) Assignee: Dayco Products, LLC, Miamisburg, OH (US)

( * ) Notice: Subject to any disclaimer, the term of this patent is extended or adjusted under 35 U.S.C. 154(b) by 134 days.

(21) Appl. No.: 10/654,567

(22) Filed: Aug. 29, 2003

(65) Prior Publication Data

US 2005/0049096 A1    Mar. 3, 2005

(51) Int. Cl.
*F16H 55/06* (2006.01)
*F16H 55/36* (2006.01)
*F16H 55/48* (2006.01)

(52) U.S. Cl. ............... 474/161; 474/170; 474/177; 474/199

(58) Field of Classification Search ........ 474/161–166, 474/142–153, 199, 902, 174–178, 189–191; 156/153, 310, 323; 384/295–296, 906; 264/275–276, 264/255, 308, 311; 524/431; 521/134
See application file for complete search history.

(56) References Cited

U.S. PATENT DOCUMENTS

| | | | | |
|---|---|---|---|---|
| 1,560,524 | A * | 11/1925 | Avery | 474/189 |
| 3,520,747 | A * | 7/1970 | McGaughey | 156/153 |
| 4,046,432 | A * | 9/1977 | Hofmann et al. | 384/510 |
| 4,177,685 | A * | 12/1979 | DeLancey | 474/113 |
| 4,366,609 | A | 1/1983 | Speer | |
| 4,468,210 | A | 8/1984 | McCutchan, Jr. | |
| 4,473,363 | A | 9/1984 | McCutchan, Jr. | |
| 4,913,688 | A | 4/1990 | Bekheet | |
| 5,176,580 | A | 1/1993 | Stamm et al. | |
| 5,476,423 | A | 12/1995 | Meyer | |
| 5,724,930 | A | 3/1998 | Sakurai et al. | |
| 5,725,448 | A | 3/1998 | Kato et al. | |
| 5,728,343 | A * | 3/1998 | Ueno | 264/275 |
| 5,782,709 | A | 7/1998 | Greimann | |
| 5,797,819 | A * | 8/1998 | Arai | 474/161 |
| 5,830,046 | A | 11/1998 | Dugger et al. | |
| 6,032,635 | A | 3/2000 | Moorman et al. | |
| 6,086,809 | A | 7/2000 | Goto et al. | |
| 6,090,001 | A | 7/2000 | Cantwell | |
| 6,102,822 | A | 8/2000 | Nakazeki | |
| 6,120,401 | A | 9/2000 | Wilken | |
| 6,181,239 | B1 | 1/2001 | Ahmed | |
| 6,200,513 | B1 | 3/2001 | Emmett | |
| 6,220,635 | B1 | 4/2001 | Vitel et al. | |
| 6,432,343 | B1 * | 8/2002 | Zollondz et al. | 264/255 |
| 6,482,140 | B1 * | 11/2002 | Takatsu | 492/31 |

FOREIGN PATENT DOCUMENTS

| | | | | |
|---|---|---|---|---|
| EP | 0856675 | A1 * | 8/1998 | |
| FR | 1595346 | A * | 7/1970 | |
| JP | 62-252436 | | * 11/1987 | 521/134 |
| JP | 02-202928 | | * 8/1990 | 524/431 |

* cited by examiner

*Primary Examiner*—Marcus Charles
(74) *Attorney, Agent, or Firm*—Joseph V. Tassone; J. Daniel Lykins

(57) ABSTRACT

An idler pulley with an integral bearing carrier insert comprising: a pulley body having a peripheral surface for accepting and retaining an endless belt; and a tubular bearing carrier insert forming a central hub along a perpendicular axis of the idler pulley body, the hub having an inner circumferential surface and an outer circumferential surface.

20 Claims, 2 Drawing Sheets

IDLER PULLEY WITH INTEGRAL BEARING CARRIER INSERT AND METHOD

BACKGROUND OF THE INVENTION

The present invention relates to the field of pulleys. In particular, the invention relates to plastic idler pulleys adapted with an integral bearing carrier insert, and to a method for manufacturing such plastic idler pulleys.

Plastic idler pulleys are known in the art as taught by U.S. Pat. Nos. 6,220,635; 6,200,513; 6,181,239; 6,120,401; 6,102,822; 6,090,001; 6,086,809; 6,032,635; 5,830,046; 5,782,709; 5,725,448; 5,724,930 and 5,176,580. Such plastic idler pulleys have heretofore been made by either molding-in a bearing, incorporated as an insert in the molding process, or by force fitting a bearing into a molded bore in the plastic part. For example, U.S. Pat. Nos. 4,468,210 and 4,473,363 describe examples of a plastic outer pulley body molded on a metal disc; and U.S. Pat. Nos. 4,913,688 and 5,476,423 describe examples of a two-step assembly wherein first a plastic outer pulley body is molded and then the metal insert is placed into the already molded pulley body.

Traditionally, when a pulley produced by the one-step process of compression molding the plastic pulley body about the metal insert, the insert is physically altered to include one or more projections such as radially extending scallops or knurls on the outer periphery of the insert.

Pulleys are also produced by the two-step process wherein a metal insert is attached to a molded plastic outer pulley by forcing the insert into the bore of the pulley. An adhesive, such as epoxy, is generally applied between the outer metal surface of the insert and the inner surface of the plastic pulley body to assist in bonding the insert to the pulley body. In each of the methods, the bearing retention is less than desirable since the clamping force which secures the bearing is dependent upon the modulus of the plastic material and upon the surface of the outer bearing race. Typically, the outer bearing is smooth and made from material having relatively little affinity for the plastic pulley. Furthermore, asymmetric forces which may occur during the molding process can distort the bearing to an out-of-round condition, thereby, shortening its useful life. For example, when an idler pulley is subjected to a heavy radial load from a belt, such as a timing belt, entrained therearound, the pulley and the bearing are slightly deformed and, since the deformation patterns of the plastic pulley and the insert are different, a slight clearance is defined between the inner surface of the pulley and the outer surface of the bearing. This clearance becomes wider as the radial force from the belt increases and over time, results in the wear of the fit surfaces of the pulley and the outer surface of the bearing, thus decreasing the joining force between the pulley and the bearing. The process of bonding with an adhesive presents undesirable clean-up and environmental problems. Accordingly, there is a need, particularly in the area of an endless drive belt of a vehicle accessories drive system, for a plastic pulley with a metal insert that may be easily manufactured without the problems associated with prior art pulleys.

SUMMARY OF THE INVENTION

In accordance with the present invention, there is provided an idler pulley having a moldable pulley body with a rigid bearing carrier insert integrally formed in the pulley body for accepting a bearing member. The bearing member may be fitted into the rigid bearing carrier insert either before or after molding.

In one aspect of the invention, the bearing member is installed into the integrally formed moldable idler pulley body and rigid tubular bearing insert before molding.

In another aspect of the invention, the bearing member is fitted into the tubular bearing carrier insert of the molded idler pulley after the idler pulley is formed.

In yet another aspect of the invention, the metal bearing insert is fitted into the bore of the tubular shell and the tubular shell having the bearing insert fitted therein is inserted into the bore of the plastic pulley body.

The material selected for the construction of the tubular shell is a suitably strong and rigid material which is compatible with the plastic material of the pulley body and with the metal bearing insert.

The tubular shell may be adapted to provide a hoop/clamping force sufficient to afford superior bearing retention and to resist unbalanced forces during molding and maintain bearing concentricity.

DETAILED DESCRIPTION OF THE INVENTION

Figure 1:
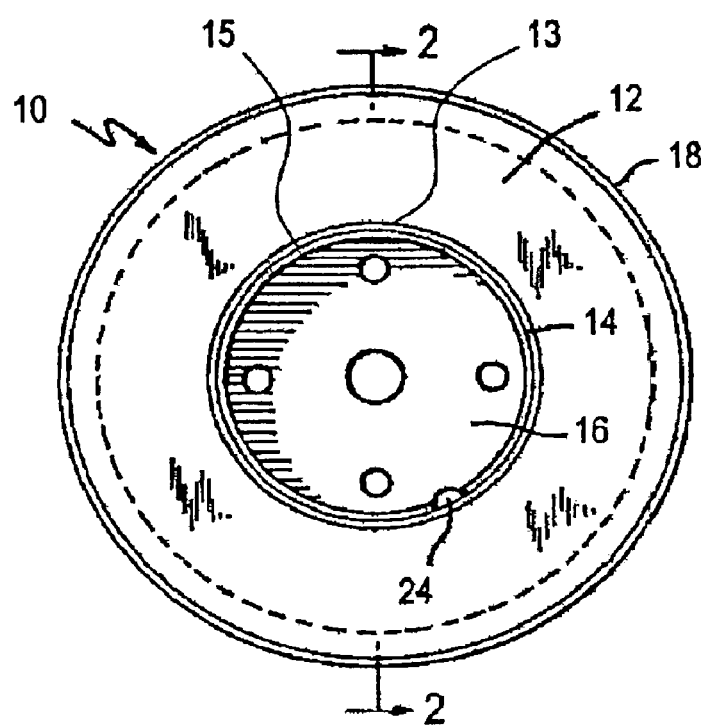
FIG. 1 illustrates one embodiment of the idler pulley with integral bearing carrier insert of the present invention.
Figure 2:
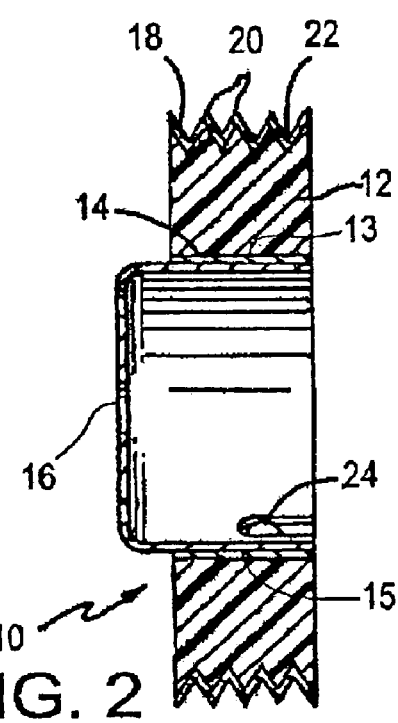
FIG. 2 is a cross-section of the idler pulley of FIG. 1 taken along lines 2-2 of FIG. 1.

Referring to the drawings, FIGS. 1 and 2 illustrate an idler pulley 10 comprising a molded plastic body 12 having an integral tubular bearing carrier insert 14 centrally positioned in the pulley body 12. The tubular bearing carrier insert 14 is incorporated between the plastic body of the pulley and an outer bearing race 15 of bearing 16. The bearing 16 may be fitted into the insert either before or after molding.

The idler pulley 10 of the invention may be from a wide variety of polymeric materials, provided that they are distortion resistant at ambient and higher temperatures. It also is generally desirable, particularly for automotive applications, that the polymeric materials used to make the pulley 10 have a low-temperature resiliency. Suitable polymeric materials include thermoplastic and thermosetting materials, such as polyamides. e.g., polyphthalamtides, nylons, particularly nylon-6, nylon-6,6, nylon-4,6; nylon 6,10; nylon 9; nylon 11 and nylon-12; polyesters, epoxy resins; phenolic resins; polyurethanes; high density polyolefins, e.g., polyethylene; and the like. The polymeric material used to manufacture the body 12 of the pulley 10 may be compounded with additional fillers, modifiers or reinforcing agents as determined for a particular application. In a preferred aspect of the invention the polymeric material contains a reinforcing material, such as a fibrous glass reinforcing material. Useful modifiers include lubricants such as polytetrafluoroethylene, silicone, graghite, molybdenum disulfide, ultra high molecular weight polyethylene.

Other suitable modifiers include thermoplastic materials, rubber, etc. Fillers may be glass beads, carbon black, minerals such as calcium carbonate, wollastonite, mica, clay, talc etc. The reinforcing agent may be glass fibers, long glass fibers, aramid, carbon fibers, etc.

The outer peripheral surface of the pulley 10 comprises a plurality of protrusions 20 and recesses 22. The protrusions may be in the form of V-shaped projections and recesses, truncated V-shaped projections and recesses, and any other useful design. In a preferred aspect of the invention, the peripheral surface of the pulley 10 comprises a metal or ceramic liner 18 to provide enhanced abrasion resistance. The liner 18 may be of any suitable material which has the desired resistance to abrasion, and is sufficiently deformable so that it can be used in the practice of the invention. Steel or aluminum having a thickness in the approximate range of about 0.010-0.050 inch is preferred.

The tubular insert 14 may be manufactured from steel, aluminum, zinc, brass, or any other suitably rigid and strong material. The insert 14 may also be coated or plated to enhance adhesion to the particular polymeric material selected for the body 12 of the idler pulley 10. For example, a brass or zinc plating over a steel tubular insert shell increases the chemical affinity of the insert for a thermoplastic phenolic material, especially if the phenolic material also incorporates any of several classes of adhesion-enhancing ingredients such as sulfur, silica, acrylates, vinyl acetates, low molecular weight polyamides, etc. The outer surface of the tubular insert 14 may contain interlocking means 13 such as knurls, splines, indents, holes, and the like to provide an irregular outer surface of said tubular insert 14 for the purpose of enhancing the mechanical interlock of the insert 14 with the plastic body 12. The inner surface of the tubular insert 14 may be provided with means 24, such as a stepped profile or detents, to accurately locate and align the bearing 16 during assembly, or the surface of the insert during molding.

Figure 3:
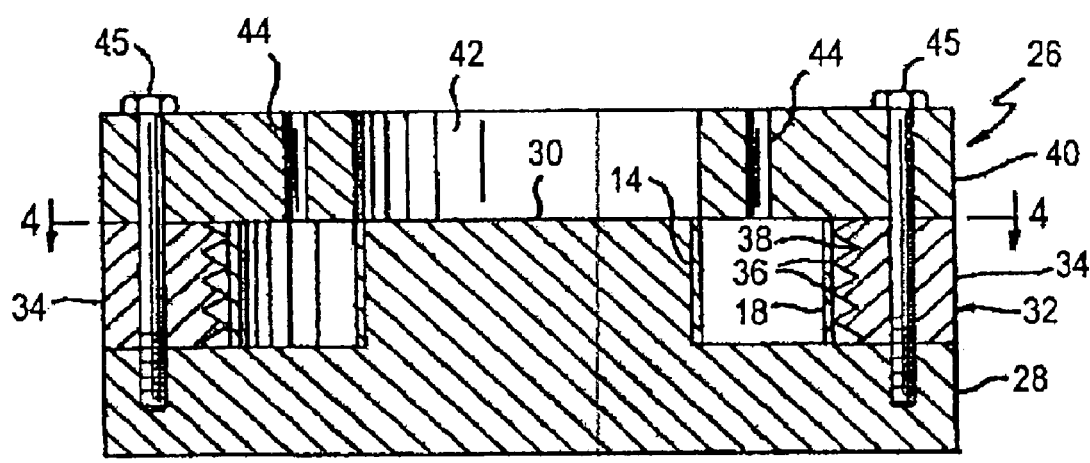
FIG. 3 is a cross-sectional view of a mold which may be used to make an idler pulley having an integral barrier carrier insert.
Figure 4:
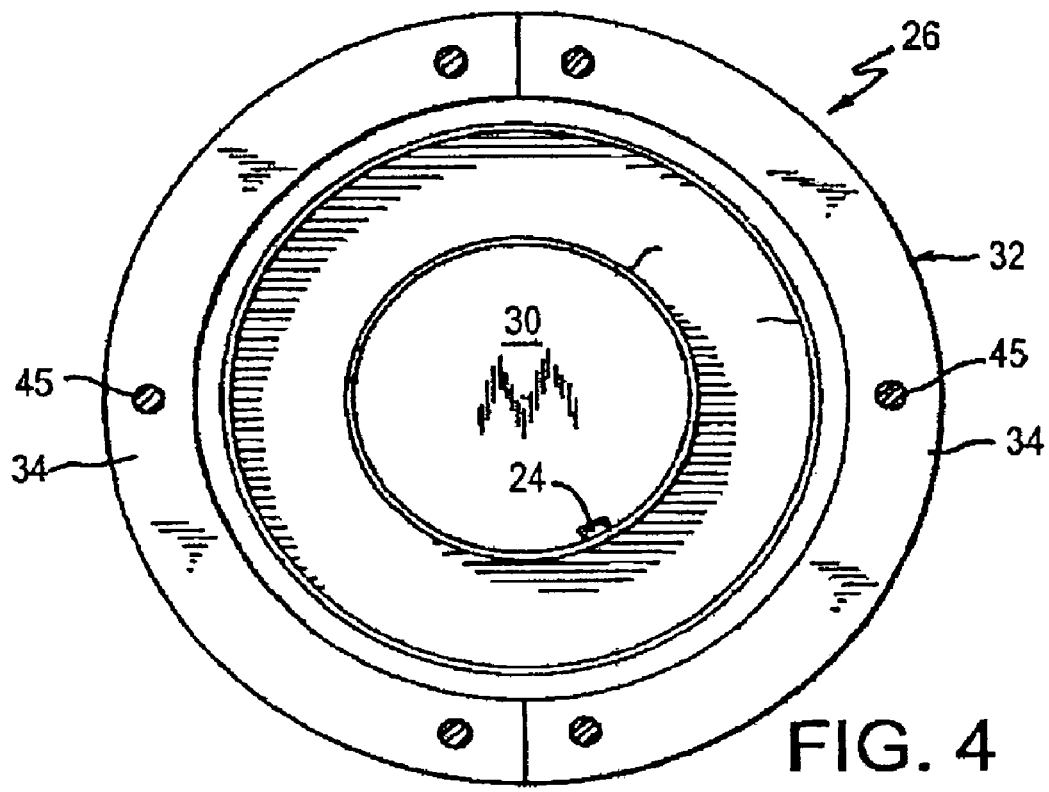
FIG. 4 is a cross-section taken along lines 4-4 of FIG. 3.
Figure 5:
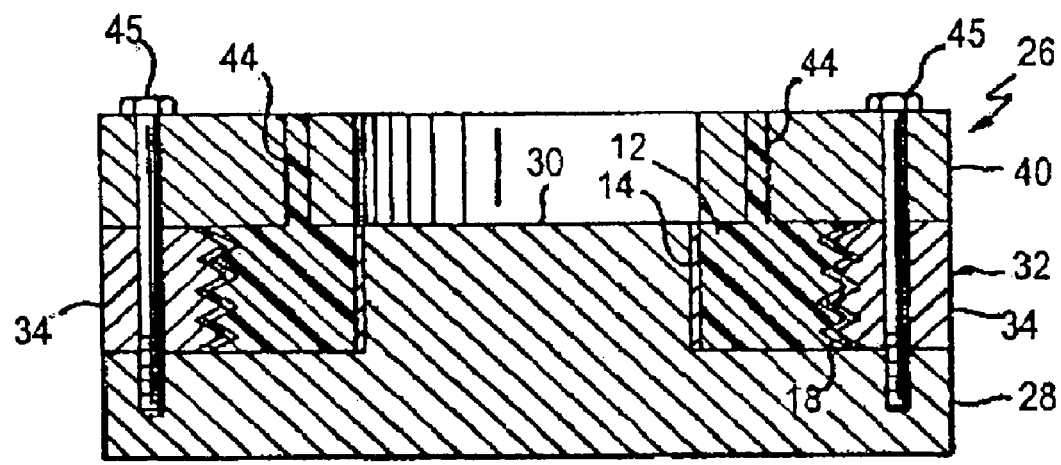
FIG. 5 is a cross-sectional view of the mold of FIG. 3 after a plastic material has been inserted into the mold cavity to make the idler pulley of the invention.

Referring now to FIGS. 3-5, the idler pulley 10 is formed using a three-section mold (or a two-section mold for flat pulleys), designated generally by the reference numeral 26. The first, or base section 28 has a cylindrical center portion 30 having an outside diameter approximately equal to the inside diameter of the tubular insert 14. The second section 32 has at least two segmented sections 34 so that the completed pulley can be easily removed. The segments 34, when in the molding position, form an annular opening. The inner periphery of the segments 34 has a plurality of projections 36 and recesses 38 corresponding to the shape of the recesses 22 and projections 20, respectively of the peripheral surface of the pulley 10. The third section 40 has a central opening 42 which has an inside diameter approximately equal to the outside diameter of the tubular insert 14. The third section 40 also has at least one injection port 44 through which the plastic material is injected into the mold 26. The mold sections may be clamped together by any suitable clamping means, such as bolts 45, as illustrated.

To make the pulley 10, the second section 32 is assembled on the first section 28 and the tubular insert 14 is inserted over the cylindrical center portion 30 of the first portion 28 and the third section 40 is assembled on the top of the second section 32 and the mold 26 is clamped together by the clamping means.

The pulley 10 is made by injecting a suitable polymeric material through the injection port(s) 44 under sufficient pressure, e.g., about 500-30,000 psi, to fill the cavity and, if present, to deform the metal liner 18, causing it to conform to the projections 36 and recesses 38 in the segments 34.

Various changes and modifications may be made to the idler pulley having an integral bearing carrier insert of the present invention, and to the method of manufacturing such idler pulley in light of the above disclosure without departing from the scope and spirit of the appended claims.

What is claimed is:

1. An idler pulley with an integral bearing carrier insert consisting of:
   a pulley body having an outer peripheral surface for accepting and retaining an endless belt, and an inner circumferential surface, said pulley body being manufactured from a moldable polymeric material;
   a tubular bearing carrier insert integrally formed in said pulley body, said tubular bearing insert defining a central hub along a perpendicular axis of said idler pulley for accepting a bearing, said insert having an inner circumferential surface and an outer circumferential surface, wherein said outer circumferential surface of said insert is coated with brass or zinc to fixedly adhere said tubular bearing carrier insert to said inner circumferential surface of said pulley body, said tubular bearing carrier insert being manufactured from a rigid material; and
   a bearing member having an outer bearing race surface fitted within said central hub such that said outer race surface of said bearing member is circumferentially adjacent said inner circumferential surface of said hub, wherein said idler pulley is free to rotate in either direction about said bearing member during use.

2. The idler pulley of claim 1 wherein said moldable polymeric material is selected from the group consisting of a polyamide, polynhthalamide, phenolic resin, epoxy resin, polyester, polyurethane, high density polyolefin, and blends thereof.

3. The idler pulley of claim 2 wherein said polymeric material is a polyphthalamide.

4. The idler pulley of claim 2 wherein said polymeric material is a polyamide.

5. The idler pulley of claim 4 wherein said polyamide is a nylon selected from the group consisting of nylon-6; nylon 6,6; nylon 4,6; nylon 6,10; nylon 9; nylon 11; and nylon 12.

6. The idler pulley of claim 5 wherein said nylon is one of nylon 6, nylon 6,6 and nylon 4,6.

7. The idler pulley of claim 1 wherein said moldable material further includes at least one of a modifier selected from the group consisting of polytetrafluoroethylene, ultra high molecular weight polyethylene, silicone, molybdenum disulfide, graphite and rubber; a filler selected from the group consisting of glass beads, carbon black, calcium carbonate, wollastonite, mica, clay and talc; a reinforcing agent selected from the group consisting of glass fiber, long glass fiber, aramid fiber, steel fiber and carbon fiber; and an adhesion promoter selected from the group consisting of sulfur, silica, acrylates, vinyl acetates and low molecular weight polyamide.

8. The idler pulley of claim 1 wherein said outer circumferential surface of said pulley body is coated with a metallic coating.

9. The idler pulley of claim 8 wherein said metallic coating is steel or aluminum.

10. The idler pulley of claim 1 wherein said tubular bearing carrier insert is manufactured from a metal or ceramic material.

11. The idler pulley of claim 10 wherein said tubular bearing carrier insert is manufactured from a metal selected from the group consisting of steel, aluminum, zinc, brass and a combination thereof.

12. The idler pulley of claim 11 wherein said tubular bearing carrier insert is manufactured from steel.

13. The idler pulley of claim 1 wherein said inner surface of said tubular insert includes locating means for locating said bearing member during assembly.

14. The idler pulley of claim 13 wherein said locating means is one of a stepped profile or detents.

15. The idler pulley of claim 1 wherein said outer circumferential surface of said tubular bearing carrier insert is knurled, splined or contains holes to provide a rough surface for enhancing interlock between said tubular bearing carrier insert and said pulley main body.

16. An idler pulley assembly with an integral bearing carrier insert consisting of
   a moldable polymeric pulley body having an outer circumferential surface and an inner circumferential surface, wherein said outer circumferential surface is adapted to accept and retain an endless belt, said pulley body being manufactured from a moldable polymeric material containing an adhesion promoter selected from the group consisting of sulfur, silica, acrylates, vinyl acetates and low molecular weight polyamide;
   a tubular metal bearing carrier insert integrally formed in said pulley body, said tubular bearing insert defining a central hub along a perpendicular axis of said pulley body for housing a bearing, said insert having an outer circumferential surface, wherein said outer circumferential surface of said insert is coated with brass or zinc to fixedly adhere said tubular metal bearing insert to said pulley body and having an inner circumferential surface provided with one or more bearing member locating means selected from the group consisting of stepped profile and detents; and
   a bearing member having an outer bearing race surface, said bearing member fitted within said central hub such that said outer race surface of said bearing member is circumferentially adjacent said inner circumferential surface of said hub, wherein said idler pulley is free to rotate in either direction about said bearing member during use.

17. The idler pulley assembly of claim 16 wherein said moldable polymeric pulley body is formed from a polyamide selected from the group consisting of nylon-6; nylon 6,6; nylon 4,6; nylon 6,10; nylon 9; nylon 11; and nylon 12.

18. The idler pulley assembly of claim 16 wherein said tubular metal bearing carrier insert is formed from steel.

19. The idler pulley of claim 16 wherein said outer circumferential surface of said tubular metal barrier carrier insert is knurled, splined or contains holes to provide a rough surface for enhancing interlock between said tubular metal bearing carrier insert and said pulley body.

20. The idler pulley of claim 16 wherein said moldable polymeric material further includes at least one of a modifier selected from the group consisting of polytetrafluoroethylene, ultra high molecular weight polyethylene, silicone, molybdenum disulfide, graphite and rubber; a filler selected from the group consisting of glass beads, carbon black, calcium carbonate, wollastonite, mica, clay and talc; and a reinforcing agent selected from the group consisting of glass fiber, long glass fiber, aramid fiber, steel fiber and carbon fiber.

* * * * *